United States Patent
Bradford et al.

(10) Patent No.: US 10,396,878 B2
(45) Date of Patent: Aug. 27, 2019

(54) CHANNEL CODING AND INTERLEAVING FOR CONTROL AND USER DATA IN THE PHYSICAL UPLINK SHARED CHANNEL

(71) Applicant: Intel IP Corporation, Santa Clara, CA (US)

(72) Inventors: Glenn Bradford, Hillsboro, OR (US); Gang Xiong, Beaverton, OR (US); Ajit Nimbalker, San Jose, CA (US); Joonyoung Cho, Santa Clara, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/072,981

(22) PCT Filed: Jun. 23, 2016

(86) PCT No.: PCT/US2016/039086
§ 371 (c)(1),
(2) Date: Jul. 26, 2018

(87) PCT Pub. No.: WO2017/142582
PCT Pub. Date: Aug. 24, 2017

(65) Prior Publication Data
US 2019/0036586 A1    Jan. 31, 2019

Related U.S. Application Data

(60) Provisional application No. 62/297,781, filed on Feb. 19, 2016.

(51) Int. Cl.
*H04B 7/06*         (2006.01)
*H04W 72/04*        (2009.01)
(Continued)

(52) U.S. Cl.
CPC .......... *H04B 7/0639* (2013.01); *H04B 7/063* (2013.01); *H04B 7/0632* (2013.01);
(Continued)

(58) Field of Classification Search
CPC .... H04B 7/0639; H04B 7/0632; H04B 7/063; H04W 72/0413; H04L 5/0053;
(Continued)

(56) References Cited

U.S. PATENT DOCUMENTS 9,686,751 B2 *   6/2017   Mizusawa ............ H04B 7/0404
2010/0238824 A1   9/2010   Farajidana et al.
(Continued)

OTHER PUBLICATIONS

International Search Report and Written Opinion for PCT/US2016/039086 dated Nov. 10, 2016.
(Continued)

*Primary Examiner* — Vineeta S Panwalkar
(74) *Attorney, Agent, or Firm* — Eschweiler & Potashnik, LLC

(57) ABSTRACT

Control information may be multiplexed, by User Equipment (UE), with non-control uplink data (e.g., user data) and transmitted in the PUSCH. In one implementation, in combining the control information and the user data, the control information and the user data may be interleaved in a manner in which the control information is mapped in a time-first direction and the user data is mapped in a frequency-first direction. Additionally, the control information may include beam information (BI).

20 Claims, 7 Drawing Sheets

(51) Int. Cl.
  *H04L 1/00*    (2006.01)
  *H04L 1/18*    (2006.01)
  *H04L 5/00*    (2006.01)
(52) U.S. Cl.
  CPC .......... *H04L 1/0072* (2013.01); *H04L 1/1861* (2013.01); *H04L 5/0044* (2013.01); *H04L 5/0053* (2013.01); *H04W 72/0413* (2013.01); *H04L 1/1893* (2013.01)
(58) Field of Classification Search
  CPC ... H04L 5/0044; H04L 1/1861; H04L 1/0072; H04L 1/1893
  See application file for complete search history.

(56) References Cited

U.S. PATENT DOCUMENTS

2016/0006548 A1    1/2016  Yang et al.
2017/0339686 A1*  11/2017  Kim .................... H04L 5/0007

OTHER PUBLICATIONS

International Preliminary Report on Patentability dated Aug. 21, 2018 for International Patent Application PCT/US2016/039086.

* cited by examiner

US 10,396,878 B2

CHANNEL CODING AND INTERLEAVING FOR CONTROL AND USER DATA IN THE PHYSICAL UPLINK SHARED CHANNEL

RELATED APPLICATIONS

The present application claims the benefit of U.S. Provisional Patent Application No. 62/297,781, which was filed on Feb. 19, 2016, the contents of which are hereby incorporated by reference as though fully set forth herein; and of PCT Application PCT/US16/39086, which was filed on Jun. 23, 2016, the contents of which are hereby incorporated by reference as though fully set forth herein.

BACKGROUND

Mobile wireless communication systems have evolved significantly from early voice systems to the highly sophisticated and high bandwidth communication platforms of today. Mobile communication systems based on the Third Generation Partnership Project (3GPP) standards are the most common standard for mobile wireless communication systems.

The next generation 3GPP wireless communication system, fifth generation (5G), may provide access to information and sharing of data anywhere, anytime by various users and applications. 5G is expected to be a unified network/system that is targeted to meet different and sometime conflicting performance dimensions and services. Such diverse multi-dimensional requirements are driven by different services and applications. In general, 5G may evolve based on the 3GPP Long Term Evolution-Advanced (LTE-A) standard with additional potential new Radio Access Technologies (RATs).

In 5G, to enable low latency transmission for enhanced mobile broadband communication, self-contained Time Division Duplex (TDD) subframes may be introduced. In TDD, a Physical Uplink Control Channel (PUCCH) may be used to transmit uplink (i.e., from the User Equipment (UE) to the network) control data, referred to as Uplink Control Information (UCI). In some situations, it may be desirable to send the UCI in the uplink data channel, referred to as the Physical Uplink Shared Channel (PUSCH). In this case, the UCI may be combined with the uplink user data in the PUSCH.

BRIEF DESCRIPTION OF THE DRAWINGS

Embodiments described herein will be readily understood by the following detailed description in conjunction with the accompanying drawings. To facilitate this description, like reference numerals may designate like structural elements. Embodiments are illustrated by way of example and not by way of limitation in the figures of the accompanying drawings.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

As described herein, UCI information (control information) may be multiplexed, by User Equipment (UE), with non-control uplink data (e.g., user data) and transmitted in the PUSCH. In one implementation, in combining the UCI information and the user data, the UCI information and the user data may be interleaved in a manner in which the control information is mapped in a time-first direction and the user data is mapped in a frequency-first direction. Additionally, the UCI information may include encoded beam forming information, referred to as beam information (BI) herein, which may include parameters relating to multi-antenna beamforming by the UE. Examples of BI include beam state information (BSI), which may consist of beam index and beam reference signal received power (B-RSRP) measured from beam reference signals (BRS), and beam refinement information (BRI), which may consist of beam index and B-RSRP measured from beam refinement reference signals (BRRS).

Transmitting the UCI in the PUSCH, instead of or in addition to the PUCCH, can be desirable in a number of situations. For example, the power available for PUCCH transmissions may be limited and thus, in some situations, such as when the UE is near the border of a cell, PUSCH transmission of control information may be desirable.

Figure 1:
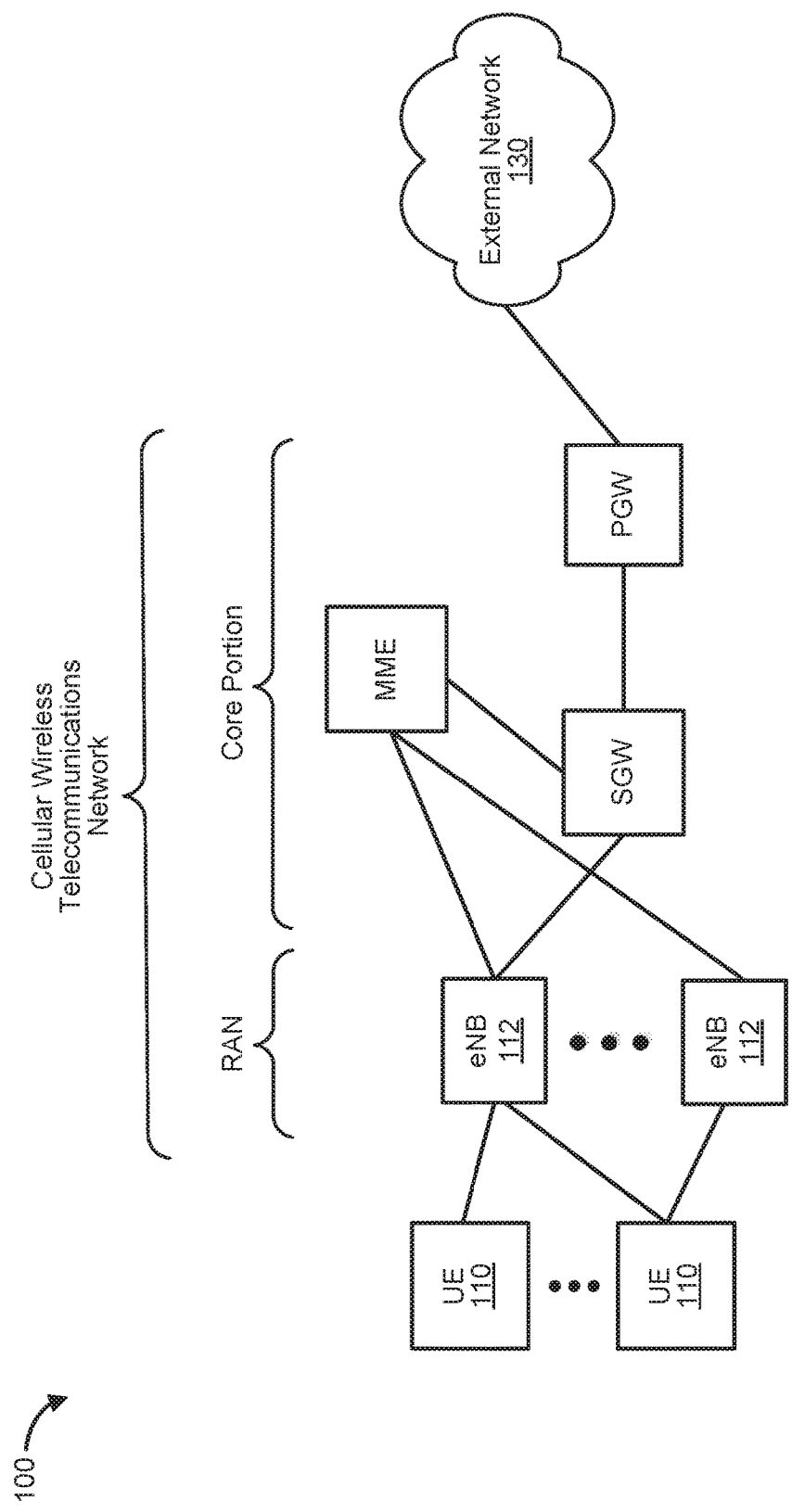
FIG. 1 is a diagram illustrating of an example environment in which systems and/or methods described herein may be implemented.

FIG. 1 is a diagram illustrating of an example environment 100 in which systems and/or methods described herein may be implemented. Environment 100 may include multiple UEs 110, a cellular wireless telecommunications network, and external network 130.

The cellular wireless telecommunications network may include a Radio Access Network (RAN) portion and a core network portion, both of which may operate based on 3GPP wireless communication standards. The RAN portion may handle the wireless radio communications (i.e., the "air" interface) between UEs 110 and the cellular wireless telecommunications network. The RAN portion may include one or more base stations. In the context of a 3GPP standards network, a base station may be referred to as an Evolved NodeB (eNB) (e.g., eNB 112). The core portion may include an Internet Protocol ("IP")-based network that includes control and backhaul functionality for the wireless telecommunications network.

The core portion may include a number of network elements, such as, for example, one or more: Serving Gateways (SGWs), PDN Gateway (PGWs), and/or Mobility Management Entities (MMEs). The core network portion may connect, through the PGW, to external network 130.

UE 110 may include a portable computing and communication devices, such as a personal digital assistant (PDA), a smart phone, a cellular phone, a laptop computer with connectivity to the wireless telecommunications network, a tablet computer, etc. UE 110 may also include non-portable computing device, such as a desktop computer, a consumer or business appliance, or another device that has the ability to connect to the RAN of the wireless telecommunications network. UE 110 may also include a computing and communication device that may be worn by a user (also referred to as a wearable device) such as a watch, a fitness band, a necklace, glasses, an eyeglass, a ring, a belt, a headset, or another type of wearable device.

eNBs 112 may include one or more network devices that receive, process, and/or transmit traffic destined for and/or received from UE 110 (e.g., via an air interface). eNBs 112 may include antennas and other logic necessary to wirelessly communicate with UEs 110. eNBs may additionally communicate with network devices, such as SGWs and/or MMEs, in the core portion of the wireless telecommunications network.

External network 130 may include an external packet data network (PDN), such as the Internet, an IP Multimedia Subsystem (IMS) network, or another type of network.

Under the 3GPP standard, a number of uplink and downlink physical channels are defined to carry information data from the Media Access Control (MAC) and higher layers. These channels are categorized as transport or control channels. Uplink communications may refer to data that is transmitted from UE 110 to eNB 112 and downlink communications may refer to data that is transmitted from eNB 112 to UE 110. In the uplink direction, physical layer channels may be defined, including: the Physical Uplink Control Channel (PUCCH); and the Physical Uplink Shared Channel (PUSCH). In the downlink direction, the physical layer channels may include: the Physical Downlink Control Channel (PDCCH) and the Physical Downlink Shared Channel (PDSCH).

The PUCCH may carry control signaling. The control signaling may include Uplink Control Information (UCI) such as Hybrid Automatic Repeat Request (HARD) Acknowledgement/Negative-Acknowledgement (ACK/NACK) feedback information; channel quality indicators (CQI) and/or Precoding Matrix Indicators (PMI), which may be referred to as CQI/PMI herein; Rank Indicator (RI) information; Beam Information (BI); and include scheduling requests for uplink transmission. The PUSCH may carry the user data (i.e., the normal uplink-scheduled (UL-SCH) data). As previously discussed, in addition to user data, the PUSCH may also carry the UCI. The PUCCH and PUSCH data may be transmitted as frames/subframes of data, in which each subframe may be divided into a number of time slots and a number of frequency slots, where the frequency slots may be referred to as sub-carriers.

Figure 2A:
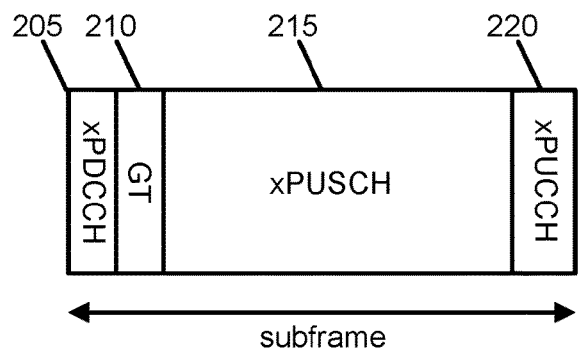
FIGS. 2A and 2B are diagrams illustrating an example of self-contained Time Division Duplex (TDD) subframes.
Figure 2B:
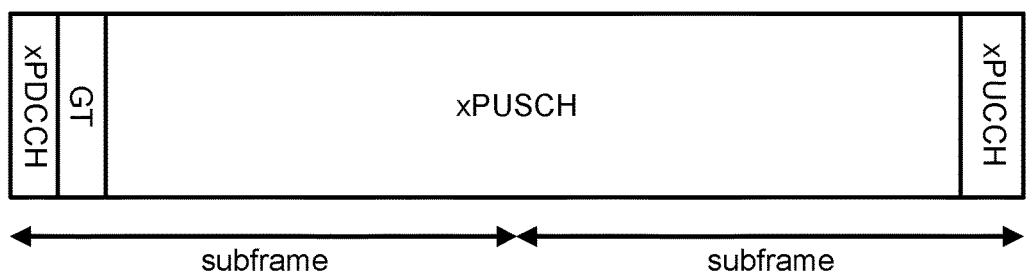

FIGS. 2A and 2B are diagrams illustrating an example of self-contained Time Division Duplex (TDD) subframes. Self-contained subframes may be useful for low latency transmissions. In FIGS. 2A and 2B, "xPUCCH," "xPUSCH," and "xPDCCH" channel labels are shown instead of PUCCH, PUSCH, and PDCCH respectively. The "x" channels may respectively refer to the 5G version of these channels. For simplicity, however, these terms may be used interchangeably herein.

FIG. 2A particularly illustrates a first type of TDD subframe. As shown, a single subframe may include a xPDCCH region 205, a guard time (GT) region 210, a xPUSCH region 215, and a xPUCCH region 220. In particular, for this subframe, xPDCCH region 205 may be followed by GT region 210. GT region 210 may provide "guard" time to accommodate downlink to uplink switching and round-trip propagation delay. Uplink user data may normally be transmitted in xPUSCH region 215 and UCI may be transmitted in PUCCH region 220. In implementations consistent with those described herein, UCI may also be transmitted, along with the user data, in xPUSCH region 215. The UCI information and user data may be interleaved in a manner in which control information is mapped in a time-first direction and user data is mapped in a frequency-first direction.

FIG. 2B particularly illustrates a second type of TDD subframe structure, in which two subframes are aggregated for one xPUSCH transmission. In the example of FIG. 2B, guard time overhead and control information overhead can be reduced relative to the subframe structure shown in FIG. 2A. As with the subframe structure of FIG. 2A, in implementations consistent with those described herein, UCI may also be transmitted, along with the user data, in the xPUSCH region. The UCI information and user data may similarly be interleaved in a time-first direction for the UCI information and a frequency-first direction for the user data.

Figure 3:
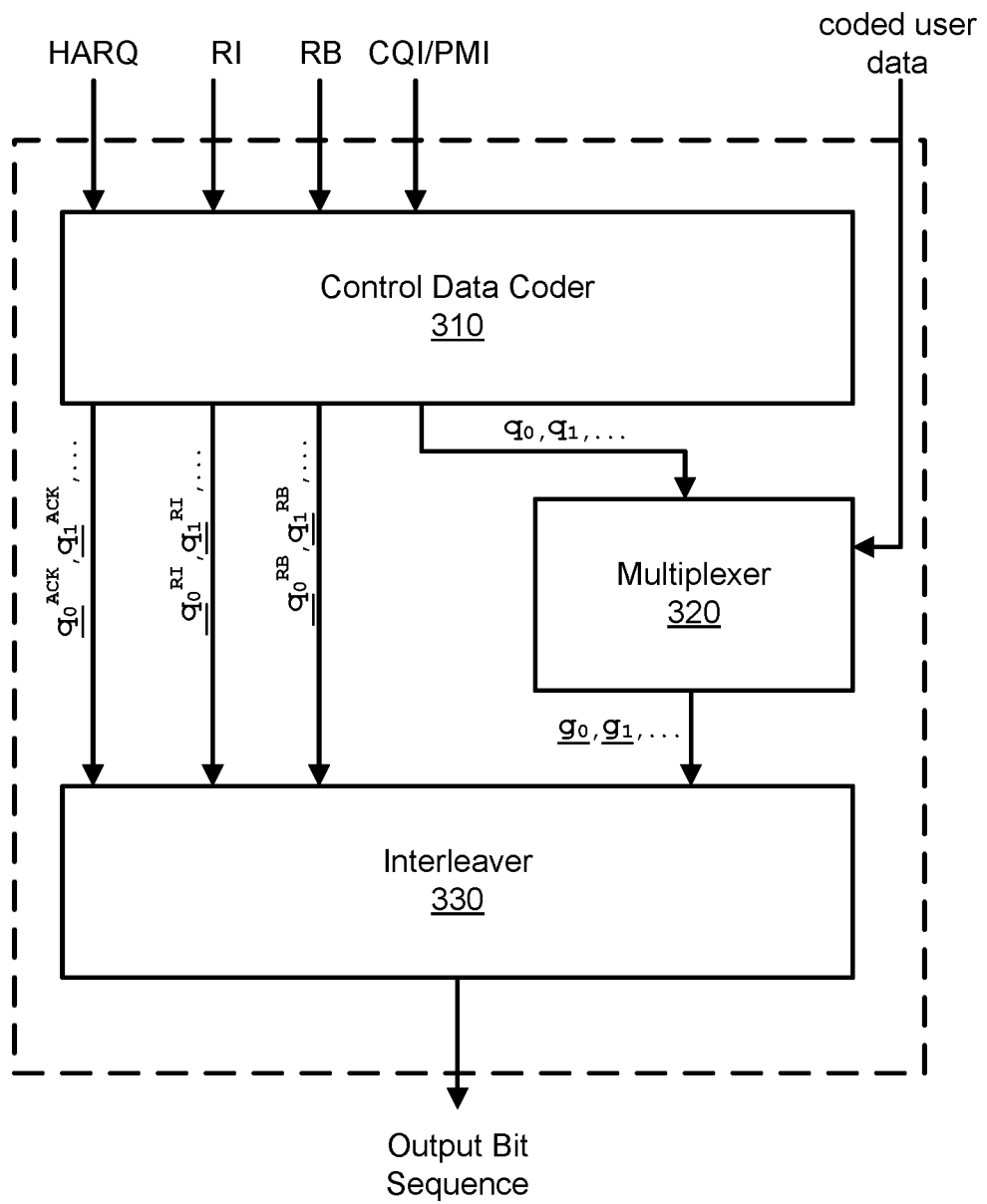
FIG. 3 is a block diagram conceptually illustrating a processing flow relating to the coding of control information for an uplink shared channel.

FIG. 3 is a block diagram conceptually illustrating a processing flow relating to the coding of control information (e.g. UCI) for the uplink shared channel (e.g., xPUSCH). The control information, that is to be transmitted via xPUSCH, may include channel quality information (CQI/PMI), HARQ ACK feedback bits, RI bits, and BI bits. The control information may be encoded by control data coder 310, multiplexed with a coded version of the user data by multiplexer 320, and interleaved by interleaver 330. As is particularly shown in FIG. 3, the coded (by control data coder 310 HARQ ACK feedback bits may include a vector sequence $q_0^{ACK}, q_1^{ACK}, \ldots$. Similarly, the coded RI bits and BI bits are illustrated as vector sequences $q_0^{RI}, q_1^{RI}, \ldots$, and $q_0^{BI}, q_1^{BI}, \ldots$ respectively. The coded bits QCI/PMI information, output by control data coder 310, may include a coded bit denoted by $q_0, q_1, \ldots$.

The output of interleaver 330 may be further processed by additional circuitry that performs, for example, radio frequency modulation and physical transmission using one or more antennas. The operations of control data coder 310, multiplexer 320, and interleaved 330 may be performed by a baseband processing section of UE 110.

Control data coder 310 may perform encoding of the control information by converting the control information to coded symbols. Different coding rates for the control information may be achieved by allocating different numbers of coded symbols for transmission. Additionally, the channel coding for the different control information (HARQ ACK feedback bits, RI bits, BI bits, and/or CQI/PMI bits) may be performed independently.

When control information is to be transmitted via xPUSCH, the number of coded modulation symbols per layer (e.g., per antenna port) for the HARQ-ACK feedback bits, RI bits, and/or the BI bits will be denoted herein as Q' and may be determined differently to enable the one transport block (e.g., as shown in FIG. 2A) or two transport block (e.g., as shown in FIG. 2B) use case.

For the case when only one transport block is transmitted in the xPUSCH, conveying the HARQ-ACK feedback bits, RI bits or BI bits, Q' may be calculated as:

$$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, M_{sc}^{PUSCH} \cdot N_{symb}^{PUSCH} - \overline{Q'}\right)$$

where:

O is the number of HARQ-ACK bits, RI bits or BI bits.

$M_{sc}^{PUSCH}$ is the scheduled bandwidth for PUSCH transmission in the current sub-frame for the transport block, expressed as a number of subcarriers.

$N_{symb}^{PUSCH}$ is the number of Orthogonal Frequency Division Multiplexing (OFDM) symbols per subframe for xPUSCH in the current sub-frame for the transport block, respectively.

For HARQ-ACK, RI, and BI $\bar{Q}'=0$, $\bar{Q}'=Q'_{ACK}$, and $\bar{Q}'=Q'_{ACK}+Q'_{RI}$, respectively.

$N_{symb}^{PUSCH-initial}=N_{symb}^{PUSCH}$, $M_{sc}^{PUSCH-initial}=M_{sc}^{PUSCH}$ and C, and $K_r$ are obtained from the initial xPDCCH for the same transport block. If there is no initial xPDCCH for the same transport block, C, and $K_r$ shall be determined from the random access response grant for the same transport block, when the xPUSCH is initiated by the random access response grant.

For the case when two transport blocks are transmitted in the xPUSCH conveying the HARQ-ACK feedback bits, RI bits or BI bits, Q' may be calculated as:

$$Q' = \max\left[\min\left(Q'_{temp}, M_{sc}^{PUSCH} \cdot N_{symb}^{PUSCH} - \bar{Q}'\right), Q'_{min}\right] \text{ with}$$

$$Q'_{temp} = \left\lceil \frac{O \cdot M_{sc}^{PUSCH-initial(1)} \cdot N_{symb}^{PUSCH-initial(1)} \cdot M_{sc}^{PUSCH-initial(2)} \cdot N_{symb}^{PUSCH-initial(2)} \cdot \beta_{offset}^{PUSCH}}{\sum_{r=0}^{C^{(1)}-1} K_r^{(1)} \cdot M_{sc}^{PUSCH-initial(2)} \cdot N_{symb}^{PUSCH-initial(2)} + \sum_{r=0}^{C^{(2)}-1} K_r^{(2)} \cdot M_{sc}^{PUSCH-initial(1)} \cdot N_{symb}^{PUSCH-initial(1)}} \right\rceil$$

where:

O is the number of HARQ-ACK bits, RI bits or BI bits. $Q'_{min}=O$ if $O\leq 2$, $Q'_{min}=\lceil 2O/Q'_m \rceil$ if $3\leq O\leq 11$ with $Q'_m\min(Q_m^1, Q_m^2)$ where $Q_m^x$, $x=\{1,2\}$ is the modulation order of transport block "x", and $Q'_{min}=\lceil 2O_1/Q'_m \rceil + \lceil 2O_2/Q'_m \rceil$ if $O>11$ with $O_1=\lceil O/2 \rceil$ and $O_2=\lfloor O/2 \rfloor$.

$M_{sc}^{PUSCH-initial(x)}$, $x=\{1,2\}$ are the scheduled bandwidths for PUSCH transmission in the subframe for the first and second transport block, respectively, expressed as a number of subcarriers in 3GPP TS 36.211 (Release 13).

$N_{symb}^{PUSCH-initial(x)}$, $x=\{1,2\}$ are the number of OFDM symbols per subframe for xPUSCH transmission for the first and second transport block.

$C^{(x)}$, $x=\{1,2\}$, and $K_r^{(x)}$, $x=\{1,2\}$ are obtained from the xPDCCH for the corresponding transport blocks.

For HARQ-ACK, $Q_{ACK}=Q_m \cdot Q'$ and $\beta_{offset}^{PUSCH}=\beta_{offset}^{HARQ-ACK}$, where $Q_m$ the modulation order of a given transport block, and $\beta_{offset}^{HARQ-ACK}$ may be determined according to 3GPP TS 36.213 (Release 13) depending on the number of transmission codewords for the corresponding xPUSCH. For RI, $Q_{RI}=Q_m \cdot Q'$, and $\beta_{offset}^{PUSCH}=\beta_{offset}^{RI}$, where $Q_m$ is the modulation order of a given transport block, and $\beta_{offset}^{RI}$ may be determined according to 3GPP Technical Specification (TS) 36.213 (Release 13), depending on the number of transmission codewords for the corresponding xPUSCH. For BI, $Q_{BI}=Q_m \cdot Q'$, and $\beta_{offset}^{PUSCH}=\beta_{offset}^{RBI}$, where $Q_m$ is the modulation order of a given transport block.

For coding of the HARQ-ACK feedback information, each positive acknowledgement (ACK) may be encoded as a binary '1' and each negative acknowledgement (NACK) may be encoded as a binary '0'. If the HARQ-ACK feedback consists of 1-bit of information, i.e., $[o_0^{ACK}]$, it may be first encoded according to Table 5.2.2.6-1 of 3GPP TS 36.212 (Release 13) (reproduced below). If the HARQ-ACK feedback consists of 2-bits of information, i.e., $[o_0^{ACK} o_1^{ACK}]$ with $o_0^{ACK}$ corresponding to HARQ-ACK bit for codeword 0 and $o_1^{ACK}$ corresponding to that for codeword 1, or if the HARQ-ACK feedback consists of 2-bits of information as a result of the aggregation of HARQ-ACK bits corresponding to two downlink cells with which UE 110 is configured by higher layers, or if the HARQ-ACK feedback consists of 2-bits of information corresponding to two subframes for TDD, it may be first encoded according to Table 5.2.2.6-2 of 3GPP TS 36.212 Release 13) (reproduced below) where $o_2^{ACK}=(o_0^{ACK}+o_1^{ACK}) \mod 2$.

TABLE 5.2.2.6-1

| $Q_m$ | Encoded HARQ-ACK |
|---|---|
| 2 | [$o_0^{ACK}$ y] |
| 4 | [$o_0^{ACK}$ y x x] |
| 6 | [$o_0^{ACK}$ y x x x x] |

TABLE 5.2.2.6-2

| $Q_m$ | Encoded HARQ-ACK |
|---|---|
| 2 | [$o_0^{ACK}$ $o_1^{ACK}$ $o_2^{ACK}$ $o_0^{ACK}$ $o_1^{ACK}$ $o_2^{ACK}$] |
| 4 | [$o_0^{ACK}$ $o_1^{ACK}$ x x $o_2^{ACK}$ $o_0^{ACK}$ x x $o_1^{ACK}$ $o_2^{ACK}$ x x] |
| 6 | [$o_0^{ACK}$ $o_1^{ACK}$ x x x x $o_2^{ACK}$ $o_0^{ACK}$ x x x x $o_1^{ACK}$ $o_2^{ACK}$ x x x x] |

In Tables 5.2.2.6-1 and 5.2.2.6-2, the "x" and "y" symbols may be placeholders, for 3GPP TS 36.211 (Release 13), to scramble the HARQ-ACK bits in a way that maximizes the Euclidean distance of the modulation symbols carrying HARQ-ACK information.

If the HARQ-ACK feedback consists of $3 \leq O^{ACK} \leq 11$ bits of information as a result of the aggregation of HARQ-ACK bits corresponding to one or more downlink cells with which UE 110 is configured by higher layers, i.e., $o_0^{ACK}$ $o_1^{ACK}, \ldots, o_{O^{ACK}-1}^{ACK}$, then a coded bit sequence $\tilde{q}_0^{ACK}$ $\tilde{q}_1^{ACK}, \ldots, o_{O^{ACK}-1}^{ACK}$ as the input to the channel coding block described in section 5.2.2.6.4 of 3GPP TS 36.212 (Release 13). In turn, the bit sequence $q_0^{ACK}$, $q_1^{ACK}$, $q_2^{ACK}, \ldots, q_{Q_{ACK}-1}^{ACK}$ may be obtained by the circular repetition of the bit sequence $\tilde{q}_0^{ACK}$ $\tilde{q}_1^{ACK}, \ldots, \tilde{q}_{31}^{ACK}$ so that the total bit sequence length is equal to $Q_{ACK}$.

If the HARQ-ACK feedback consists of $11<O^{ACK} \leq 22$ bits of information as a result of the aggregation of HARQ-ACK bits corresponding to one or more downlink cells with which UE 110 is configured by higher layers, i.e., $o_0^{ACK}$ $o_1^{ACK}, \ldots, o_{O^{ACK}-1}^{ACK}$, then the coded bit sequence $q_0^{ACK}$, $q_1^{ACK}, q_2^{ACK}, \ldots, q_{Q_{ACK}-1}^{ACK}$ may be obtained by using the bit sequence $o_0^{ACK}$ $o_1^{ACK}, \ldots, o_{O^{ACK}-1}^{ACK}$ as the input to the channel coding block described in section 5.2.2.6.5 of 3GPP TS 36.212 (Release 13).

If the HARQ-ACK feedback includes $O^{ACK}>22$ bits of information as a result of the aggregation of HARQ-ACK bits corresponding to one or more downlink cells with which UE 110 is configured by higher layers, the coded bit sequence may be denoted by $q_0^{ACK}, q_1^{ACK}, q_2^{ACK}, \ldots, q_{Q_{ACK}-1}^{ACK}$. Cyclic Redundancy Check (CRC) attachment, channel coding and rate matching of the HARQ-ACK bits may be performed according to section 5.1.1 of 3GPP TS 36.212 (Release 13), (setting L to 8 bits), section 5.1.3.1 of 3GPP TS 36.212 (Release 13), and section 5.1.4.2 of 3GPP TS 36.212 (Release 13), respectively. The input bit sequence to the CRC attachment operation may be defined as $o_0^{ACK}$ $o_1^{ACK}, \ldots, o_{O^{ACK}-1}^{ACK}$. The output bit sequence of the CRC attachment operation may be the input bit sequence to the channel coding operation.

When HARQ-ACK feedback information is to be multiplexed with user data at a given xPUSCH, the HARQ-ACK information may be multiplexed in all layers of all transport blocks of that xPUSCH. For a given transport block, the vector sequence output of the channel coding for HARQ-ACK information may be denoted by $q_0^{ACK}, q_1^{ACK}, \ldots, q_{Q'_{ACK}-1}^{ACK}$, where $q_i^{ACK}$, i=0, . . . , $Q'_{ACK}-1$ are column vectors of length $(Q_m \cdot N_L)$ and where $Q'_{ACK}=Q_{ACK}/Q_m$ is obtained using the pseudocode shown in Table I, below, where, in Table I, $N_L$ is the number of layers onto which the user data transport block is mapped. In Table I, $\hat{q}_k^{ACK}=[q_i^{ACK} \ldots q_{i+Q_m-1}^{ACK}]$ may be used to create a temporary row vector and $$q_k^{ACK} = [\overline{\hat{q}_k^{ACK} \ldots \hat{q}_k^{ACK}}]^T$$

replicates the row vector, $\hat{q}_k^{ACK}$, $N_L$ times and transposes the row vector into a column vector.

TABLE I

Set i, k to 0.
While i < $Q_{ACK}$
$\hat{q}_k^{ACK} = [q_i^{ACK} \ldots q_{i+Q_m-1}^{ACK}]$
$q_k^{ACK} = [\overline{\hat{q}_k^{ACK} \ldots \hat{q}_k^{ACK}}]^T$
i = i + $Q_m$
k = k + 1
End While The RI bit coding, by control data code 310, will next be described.

If the RI is implemented as one bit of information, i.e., $[o_0^{RI}]$, the RI information is first encoded according to Table 5.2.2.6-3 of 3GPP TS 36.212 (Release 13) (reproduced below). The $[o_0^{RI}]$ to RI mapping is given by Table 5.2.2.6-5 of 3GPP TS 36.212 (Release 13) (reproduced below). If the RI is implemented as two bits of information, i.e., $[o_0^{RI} o_1^{RI}]$ with $o_0^{RI}$ corresponding to the Most Significant Bit (MSB) of the 2-bit input and $o_1^{RI}$ corresponding to the Least Significant Bit (LSB), the RI may be first encoded according to Table 5.2.2.6-4 of 3GPP TS 36.212 (Release 13) (reproduced below) where $o_2^{RI}=(o_0^{RI}+o_1^{RI}) \mod 2$. The $[o_0^{RI} o_1^{RI}]$ to RI mapping is given by Table 5.2.2.6-6 of 3GPP TS 36.212 (Release 13) (reproduced below).

TABLE 5.2.2.6-3

Encoding of 1-bit RI.

| $Q_m$ | Encoded RI |
|---|---|
| 2 | $[o_0^{RI} \ y]$ |
| 4 | $[o_0^{RI} \ y \ x \ x]$ |
| 6 | $[o_0^{RI} \ y \ x \ x \ x \ x]$ |

TABLE 5.2.2.6-4

Encoding of 2-bit RI.

| $Q_m$ | Encoded RI |
|---|---|
| 2 | $[o_0^{RI} o_1^{RI} o_2^{RI} o_0^{RI} o_1^{RI} o_2^{RI}]$ |
| 4 | $[o_0^{RI} o_1^{RI} \ x \ x \ o_2^{RI} o_0^{RI} \ x \ x \ o_1^{RI} o_2^{RI} \ x \ x]$ |
| 6 | $[o_0^{RI} o_1^{RI} \ x \ x \ x \ x \ o_2^{RI} o_0^{RI} \ x \ x \ x \ x \ o_1^{RI} o_2^{RI} \ x \ x \ x \ x]$ |

TABLE 5.2.2.6-5

| $o_0^{RI}$ | RI |
|---|---|
| 0 | 1 |
| 1 | 2 |

TABLE 5.2.2.6-6

| $o_0^{RI}, o_1^{RI}$ | RI |
|---|---|
| 0, 0 | 1 |
| 0, 1 | 2 |
| 1, 0 | 3 |
| 1, 1 | 4 |

TABLE 5.2.2.6-7

| $o_0^{RI}, o_1^{RI}, o_2^{RI}$ | RI |
|---|---|
| 0, 0, 0 | 1 |
| 0, 0, 1 | 2 |
| 0, 1, 0 | 3 |
| 0, 1, 1 | 4 |
| 1, 0, 0 | 5 |
| 1, 0, 1 | 6 |
| 1, 1, 0 | 7 |
| 1, 1, 1 | 8 |

When the RI, for a given a downlink cell, is implemented as three bits of information, i.e., $[o_0^{RI} o_1^{RI} o_2^{RI}]$ with $o_0^{RI}$ corresponding to the MSB of the three bit input and $o_2^{RI}$ corresponding to the LSB, the $[o_0^{RI} o_1^{RI} o_2^{RI}]$ to RI mapping may be given by Table 5.2.2.6-7 of 3GPP TS 36.212 (Release 13) (reproduced above). If the RI is implemented as $3 \leq O^{RI} \leq 11$ bits of information, i.e., $[o_0^{RI} o_1^{RI}, \ldots, o_{O^{RI}-1}^{RI}]$, then a coded bit sequence $[\tilde{q}_0^{RI} \tilde{q}_1^{RI}, \ldots, \tilde{q}_{31}^{RI}]$ may be obtained by using the bit sequence $[o_0^{RI} o_1^{RI}, \ldots, o_{O^{RI}-1}^{RI}]$ as the input to the channel coding block described in section 5.2.2.6.4 of the 3GPP TS 36.212 (Release 13) specification. If the RI information is implemented as $11 < O^{RI} \leq 22$ bits of information, i.e., $[o_0^{RI} o_1^{RI}, \ldots, o_{O^{RI}-1}^{RI}]$ then the coded bit sequence $q_0^{RI}, q_1^{RI}, q_2^{RI}, \ldots, q_{Q_{RI}-1}^{RI}$ may be obtained using the bit sequence $[o_0^{RI} o_1^{RI}, \ldots, o_{O^{RI}-1}^{RI}]$ as the input to the channel coding block described in section 5.2.2.6.5 of the 3GPP TS 36.212 (Release 13) specification. If the RI is implemented as $O^{RI} > 22$ bits of information, i.e., $[o_0^{RI} o_1^{RI}, \ldots, o_{O^{RI}-1}^{RI}]$, then the coded bit sequence may be denoted by $q_0^{RI}, q_1^{RI}, q_2^{RI}, \ldots, q_{Q_{RI}-1}^{RI}$. Cyclic Redundancy Check (CRC) attachment, channel coding and rate matching of the HARQ-ACK bits may be performed according to section 5.1.1 of 3GPP TS 36.212 (Release 13) specification (setting L to 8 bits), section 5.1.3.1 of 3GPP TS 36.212 (Release 13), specification, and section 5.1.4.2 of 3GPP TS 36.212 (Release 13), respectively. The input bit sequence to the CRC attachment operation may be defined as $[o_0^{RI} o_1^{RI}, \ldots, o_{O^{RI}-1}^{RI}]$. The output bit sequence of the CRC attachment operation may be the input bit sequence to the channel coding operation.

In Tables 5.2.2.6-3 and 5.2.2.6-4, the "x" and "y" symbols may be placeholders, in the 3GPP TS 36.211 (Release 13) specification, to scramble the RI bits in a way that maximizes the Euclidean distance of the modulation symbols carrying rank information.

For the situation in which the RI information is implemented as one or two bits of information, the bit sequence $q_0^{RI}, q_1^{RI}, q_2^{RI}, \ldots, q_{Q_{RI}-1}^{RI}$ may be obtained by concatenation of multiple encoded RI blocks where $Q_{RI}$ is the total number of coded bits for all the encoded RI blocks. The last concatenation of the encoded RI block may be partial so that the total bit sequence length is equal to $Q_{RI}$. For the case where RI feedback consists of $3 \leq O^{RI} \leq 11$ bits of information, the bit sequence $q_0^{RI}, q_1^{RI}, q_2^{RI}, \ldots, q_{Q_{RI}-1}^{RI}$ may be obtained by the circular repetition of the bit sequence $\tilde{q}_0^{RI}$ $\tilde{q}_1^{RI}, \ldots, \tilde{q}_{31}^{RI}$ so that the total bit sequence length is equal to $Q_{RI}$.

When rank information is to be multiplexed with UL-SCH at a given xPUSCH, the rank information may be multiplexed in all layers of all transport blocks of that xPUSCH. For a given transport block, the vector sequence output of the channel coding for rank information is denoted by $\underline{q}_0^{RI}, \underline{q}_1^{RI}, \ldots, \underline{q}_{Q'_{RI}-1}^{RI}$, where $\underline{q}_i^{RI}$, i=0, ..., $Q'_{RI}-1$ are column vectors of length $(Q_m \cdot N_L)$ and where $Q'_{RI} = Q_{RI}/Q_m$. The vector sequence may be obtained using the pseudo-code shown in Table II (below), where $N_L$ is the number of layers onto which the user data transport block is mapped. In Table II, $\hat{\underline{q}}_k^{RI} = [q_i^{RI} \ldots q_{i+Q_m-1}^{RI}]$ is used to create a temporary row vector and $$\underline{q}_k^{RI} = [\overline{\hat{q}_k^{RI} \ldots \hat{q}_k^{RI}}]^T \overset{N_L}{}$$

replicates the row vector, $\hat{\underline{q}}_k^{RI}$, $N_L$ times and transposes the row vector into a column vector.

TABLE II

Set i, j, k to 0
While i < $Q_{RI}$
$\hat{\underline{q}}_k^{RI} = [q_i^{RI} \ldots q_{i+Q_m-1}^{RI}]$ $q_k^{RI} = [\overline{\hat{q}_k^{RI} \ldots \hat{q}_k^{RI}}]^T \overset{N_L}{}$
i = i + $Q_m$
k = k + 1
End while The BI information coding, by control data code 310, may be based on the same technique, described above, coding of the RI information, where BI is used instead of RI in the given equations and descriptions.

The CQI/PMI information coding, by control data code 310, will next be described.

When UE 110 transmits CQI/PMI information, it may determine the number of modulation coded symbols per layer Q' for channel quality information as $$Q' = \min\left(\left\lceil\frac{(O+L) \cdot M_{sc}^{PUSCH-initial(x)} \cdot N_{symb}^{PUSCH-initial(x)} \cdot \beta_{offset}^{PUSCH}}{\sum_{r=0}^{C^{(x)}-1} K_r^{(x)}}\right\rceil, \right.$$
$$\left. M_{sc}^{PUSCH} \cdot N_{symb}^{PUSCH} - \frac{Q_{ACK}^{(x)} + Q_{RI}^{(x)} + Q_{RBI}^{(x)}}{Q_m^{(x)}}\right)$$

where:
O is the number of CQI/PMI bits,
L is the number of CRC bits given by $$L = \begin{cases} 0 & O \leq 11 \\ 8 & \text{otherwise} \end{cases},$$

and
$Q_{CQI} = Q_m^{(x)} \cdot Q'$ and $\beta_{offset}^{PUSCH} = \beta_{offset}^{CQI}$, where $\beta_{offset}^{CQI}$ may be determined according to 3GPP TS 36.213 (Release 13), depending on the number of transmission codewords for the corresponding xPUSCH.

If HARQ-ACK, RI, or BI is not transmitted, then $Q_{ACK}^{(x)} = 0$, $Q_{RI}^{(x)} = 0$, or $Q_{BI}^{(x)} = 0$, respectively.

The variable "x" in $K_r^{(x)}$ represents the transport block index corresponding to the highest $I_{MCS}$ value indicated by the uplink grant. For the situation in which two transport blocks have the same $I_{MCS}$ value in the corresponding uplink grant, "x=1", which corresponds to the first transport block. $N_{symb}^{PUSCH-initial(x)}$, $M_{sc}^{PUSCH-initial(x)}$, $C^{(x)}$, and $K_r^{(x)}$ are obtained from the xPDCCH for the same transport block. If there is no xPDCCH for the same transport block, $M_{sc}^{PUSCH-initial(x)}$, $C^{(x)}$, and $K_r^{(x)}$ shall be determined from:

The random access response grant for the same transport block, when xPUSCH is initiated by the random access response grant. For user data (UL-SCH data) information $G = N_L^{(x)} \cdot (N_{symb}^{PUSCH} \cdot M_{sc}^{PUSCH} \cdot Q_m^{(x)} - Q_{CQI} - Q_{BI}^{(x)} - Q_{RI}^{(x)} - Q_{ACK}^{(x)})$, where $N_L^{(x)}$ is the number of layers the corresponding UL-SCH transport block is mapped onto, $M_{sc}^{PUSCH}$ is the scheduled bandwidth for xPUSCH transmission in the current sub-frame for the transport block, and $N_{symb}^{PUSCH}$ is the number of OFDM symbols in the current xPUSCH transmission sub-frame block obtained from the xPDCCH for the same transport block.

If the CQI/PMI payload size is less than or equal to 11 bits, the channel coding of the channel quality information may performed according to section 5.2.2.6.4 of 3GPP TS 36.212 (Release 13), with input sequence $o_0, o_1, o_2, \ldots, o_{O-1}$.

For CQI/PMI payload sizes greater than 11 bits, the CRC attachment, channel coding and rate matching of the channel quality information may be performed according to sections 5.1.1, 5.1.3.1 and 5.1.4.2, respectively, of 3GPP TS 36.212 (Release 13). The input bit sequence to the CRC attachment operation may be defined as $o_0, o_1, o_2, \ldots, o_{O-1}$. The output bit sequence of the CRC attachment operation is the input bit sequence to the channel coding operation. The output bit sequence of the channel coding operation may be the input bit sequence to the rate matching operation.

The output sequence for the channel coding of CQI/PMI may be denoted by $q_0, q_1, q_2, q_3, \ldots, q_{N_L \cdot Q_{CQI}-1}$, where $N_L$ is the number of layers the corresponding user data (UL-SCH) transport block is mapped onto.

Referring back to FIG. 3, multiplexer 320 may perform multiplexing of the user data and the coded control data (output from control data coder 310) such that the control data and the user data are mapped to different modulation symbols. The inputs to multiplexer 320 may include the coded bits of the CQI/PMI information, denoted by $q_0, q_1, q_2, q_3, \ldots, q_{N_L \cdot Q_{CQI}-1}$, where $Q'_{CQI} = Q_{CQI}/Q_m$, and the coded bits of the user data (UL-SCH) denoted by $f_0, f_1, f_2, f_3, \ldots, f_{G-1}$. The output of multiplexer 320 may be denoted as $g_0, g_1, g_2, g_3, \ldots, g_{H'-1}$, where $H = (G + N_L \cdot Q_{CQI})$ and $H' = H/(N_L \cdot Q_m)$, and where $g_i$, i=0, ..., H'-1 are column vectors of length $(Q_m \cdot N_L)$. H is the total number of coded bits allocated for the user data and CQI/PMI information across the $N_L$ transmission layers of the transport block. Multiplexer 320 may operate so that the output of multiplexer 320, $g_0, g_1, g_2, g_3, \ldots, g_{H'-1}$, is constructed such that control and user data may be mapped to different modulation symbols.

For the case where more than one user data transport block is transmitted in a subframe of an uplink cell, the CQI/PMI information may be multiplexed with data only on the UL-SCH transport block with highest $I_{MCS}$ value on the grant. When two transport blocks have the same $I_{MCS}$ value in the uplink grant, the CQI/PMI information may be multiplexed with data only on the first transport block. For that UL-SCH transport block or in the case of single transport block transmission, and assuming that $N_L$ is the number of layers onto which the UL-SCH transport block is mapped, the control information and the data may be multiplexed as is shown in the pseudo-code included in Table III (below).

TABLE III

Set i, j, k to 0
While j < $N_L \cdot Q_{CQI}$
  $\underline{g}_k = [q_j \ldots q_{j+N_L \cdot Q_m-1}]^T$
  j = j + $N_L \cdot Q_m$
  k = k + 1
End While
While i < G
  $\underline{g}_k = [f_i \ldots f_{i+Q_m \cdot N_L-1}]^T$
  i = i + $Q_m \cdot N_L$
  k = k + 1
End While Interleaver 330 may operate to interleave its input data (i.e., control modulation symbols and data modulation symbols) to obtain a time-first mapping of control modulation symbols and frequency-first mapping of data modulation symbols. The input to interleaver 330 may include the following vector sequences: $\underline{g}_0, \underline{g}_1, \underline{g}_2, \ldots, \underline{g}_{H'-1}$, (output of the data and control multiplexing performed by multiplexer 320); $\underline{q}_0^{ACK}, \underline{q}_1^{ACK}, \underline{q}_2^{ACK}, \ldots, \underline{q}_{Q'_{ACK}-1}^{ACK}$, (the coded HARQ-ACK information) $\underline{q}_0^{RI}, \underline{q}_1^{RI}, \underline{q}_2^{RI}, \ldots, \underline{q}_{Q'_{RI}-1}^{RI}$ (the coded RI information) and $\underline{q}_0^{BI}, \underline{q}_1^{BI}, \underline{q}_2^{BI}, \ldots, \underline{q}_{Q'_{BI}-1}^{BI}$ (the coded beam information). The number of modulation symbols per layer in the subframe is given by $H'_{total} = H' + Q'_{ACK} + Q'_{RI} + Q'_{BI}$. The output of interleaver 330 may be an output bit sequence that may be transmitted, after modulation with the carrier radio frequencies, via one or more antenna elements of UE 110.

Figure 4A:
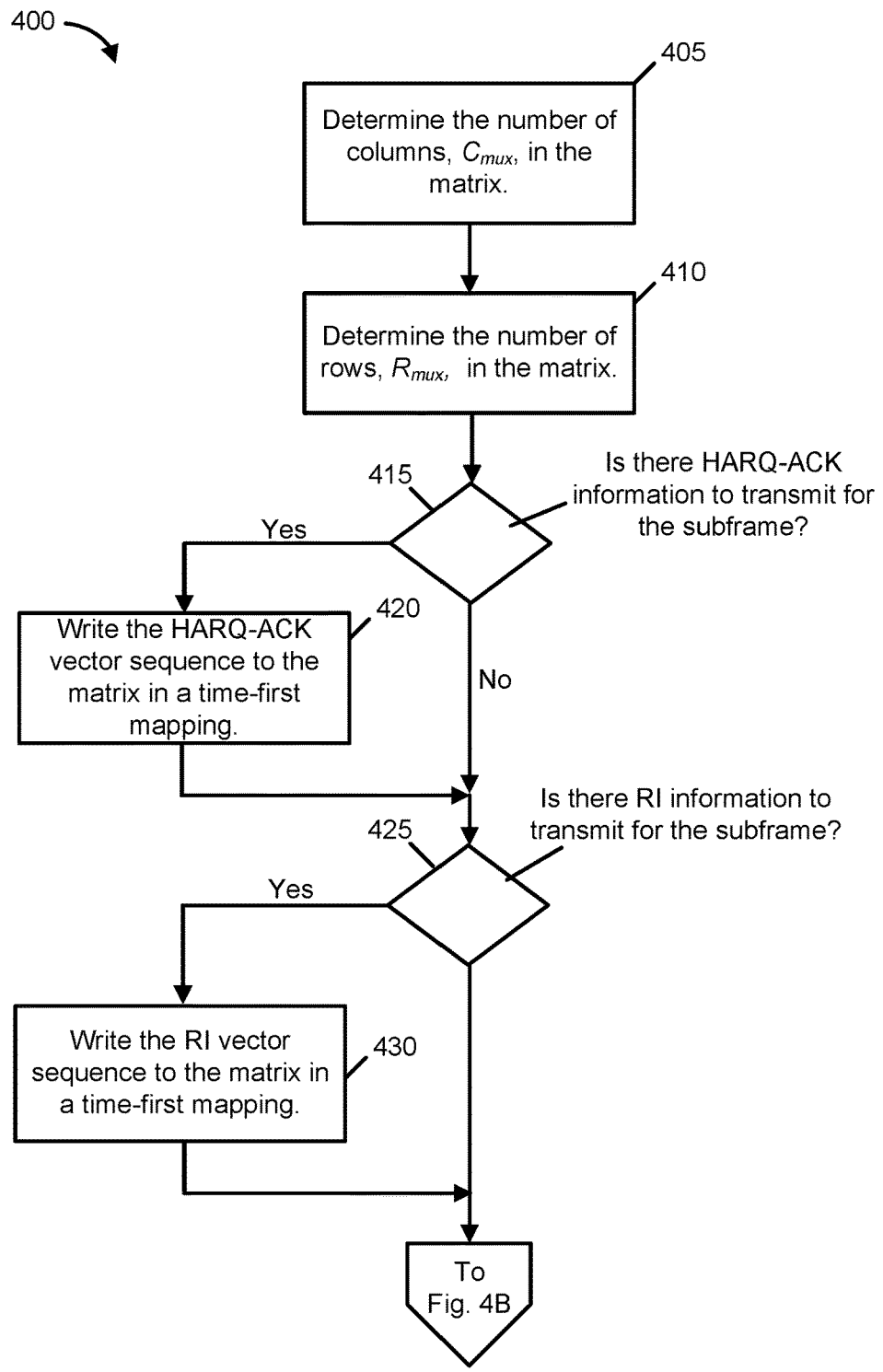
FIGS. 4A and 4B are flowcharts of an example process corresponding to the interleaving operation performed by an interleaver.
Figure 4B:
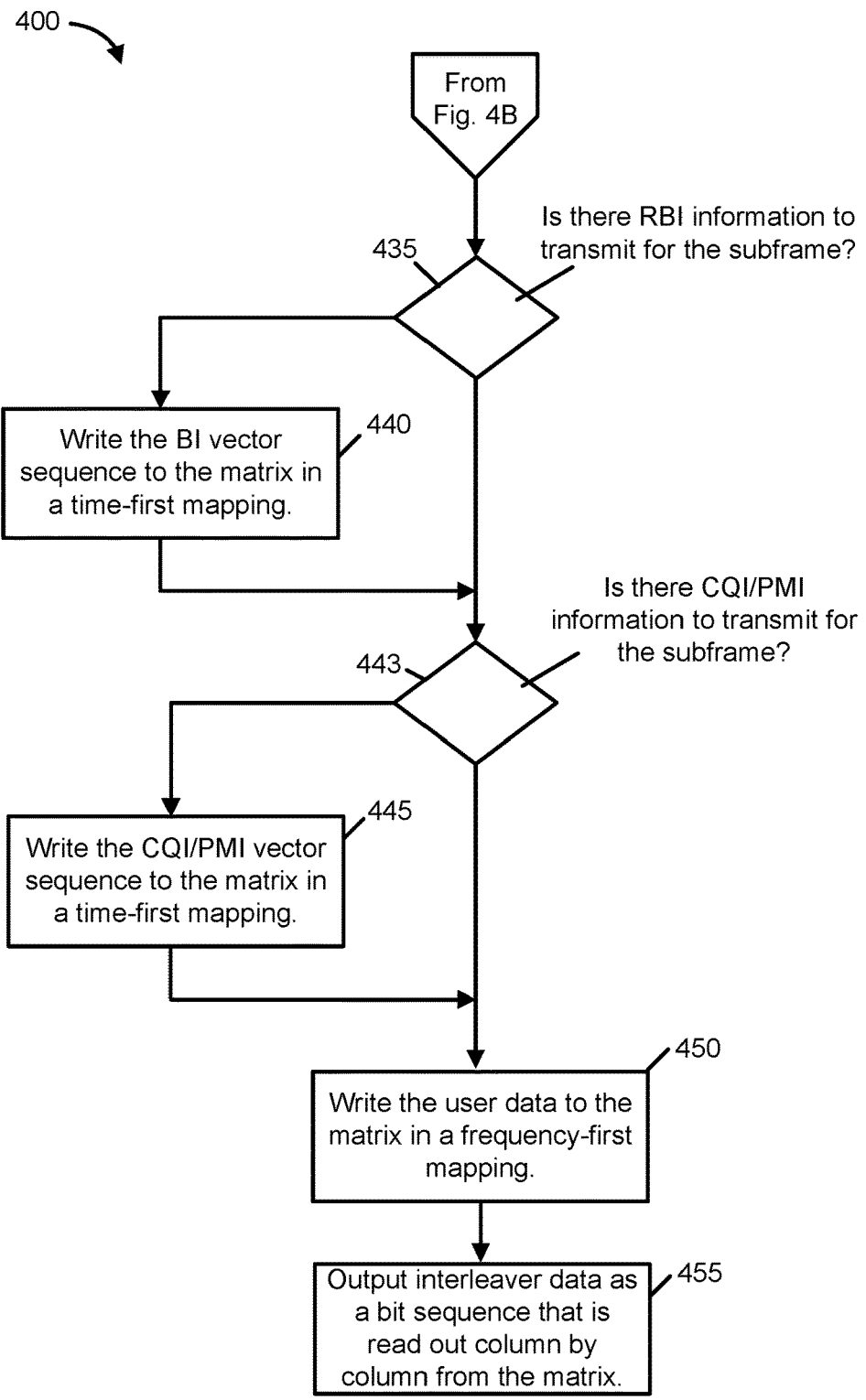

FIGS. 4A and 4B illustrate a flowchart of an example process 400 corresponding to the interleaving operation performed by interleaver 330. In general, process 400 may include writing the inputs, to interleaver 400, to a matrix, in a particular order, and then reading out the values in the matrix in a second particular order. The entries of the matrix may represent resource elements in a subframe.

Process 400 may include determining the number of columns, $C_{mux}$, in the matrix (block 405). In one implementation, the number of columns may be assigned as $N_{symb}^{PUSCH}$, where $N_{symb}^{PUSCH}$ represents the number of Orthogonal Frequency Division multiplexing (OFDM) symbols per subframe for xPUSCH in the current sub-frame for the transport block. $N_{symb}^{PUSCH}$ may be determined as described in section 5.2.2.6 of 3GPP TS 36.212, v13.0.0. The columns of the matrix may be numbered, from left to right, as 0, 1, 2, ..., $C_{mux}-1$.

Process 400 may further include determining the number of rows, $R_{mux}$, in the matrix (block 410). In one implementation, $R_{mux}$ may be determined as $(H'_{total} \cdot Q_m \cdot N_L)/C_{mux}$.

Additionally, define $R'_{mux} = R_{mux}/(Q_m \cdot N_L)$. The rows of the matrix may be numbered 0, 1, 2, ..., $R_{mux}-1$. The matrix may thus be:

$$\begin{bmatrix} \underline{y}_0 & \underline{y}_1 & \underline{y}_2 & \cdots & \underline{y}_{C_{max}-1} \\ \underline{y}_{C_{max}} & \underline{y}_{C_{max}+1} & \underline{y}_{C_{max}+2} & \cdots & \underline{y}_{2C_{max}-1} \\ \vdots & \vdots & \vdots & \ddots & \vdots \\ \underline{y}_{(R'_{max}-1) \times C_{max}} & \underline{y}_{(R'_{max}-1) \times C_{max}+1} & \underline{y}_{(R'_{max}-1) \times C_{max}+2} & \cdots & \underline{y}_{\left(R'_{max} \times \atop C_{max}-1\right)} \end{bmatrix},$$

where each entry $\underline{y}_j$ may represent a vector.

Process 400 may further include determining if there is HARQ-ACK information to transmit for the subframe (block 415). When there is HARK-ACK information, such as when the output of coder 310 includes a vector sequence, process 400 may further include writing the vector sequence to the matrix in a time-first mapping (block 420). In one implementation, the input vector sequence may be written to the $(R_{mux} \times C_{mux})$ matrix by sets of $(Q_m \cdot N_L)$ rows starting with the vector $\underline{y}_0$ in column 0 and rows 0 to $(Q_m \cdot N_L - 1)$ according to the pseudo-code indicated in Table IV. As illustrated in the pseudo-code of Table IV, each of the HARQ-ACK input vectors may be mapped to the matrix in a row-wise (time-first) mapping.

TABLE IV

Set i to 0.
While i < $Q'_{ACK}$ :
  $\underline{y}_i = \underline{q}_i^{ACK}$
  i = i + 1
End While Process 400 may further include determining if there is rank information to transmit for the subframe (block 425). When there is rank information, such as when the output of coder 310 includes a RI vector sequence (e.g., $\underline{q}_i^{RI}$), process 400 may further include writing the RI vector sequence to the matrix in a time-first mapping (block 430). In one implementation, the input vector sequence may be written to the $(R_{mux} \times C_{mux})$ according to the pseudo-code indicated in Table V. As illustrated in the pseudo-code of Table V, each of the RI input vectors may be mapped to the matrix in a row-wise (time-first) mapping, starting at the index after the last index used for the HARQ-ACK mapping.

TABLE V

Set i to 0.
While i < $Q'_{RI}$ :
  $\underline{y}_{i+Q'_{ACK}} = \underline{q}_i^{RI}$
  i = i + 1
End While Process 400 may further include determining if there is BI information to transmit for the subframe (block 435). When there is BI information, such as when the output of coder 310 includes the $\underline{q}_i^{BI}$ vector sequence, process 400 may further include writing the vector sequence to the matrix in a time-first mapping (block 440). In one implementation, the input vector sequence may be written to the $(R_{mux} \times C_{mux})$ according to the pseudo-code indicated in Table VI. As illustrated in the pseudo-code of Table VI, each of the BI input vectors may be mapped to the matrix in a row-wise (time-first) mapping, starting at the index after the last index used for the RI mapping.

TABLE VI

Set i to 0.
While i <$Q'_{BI}$ :
$\quad y_{i+Q'_{ACK}+Q'_{RI}} = q_i^{BI}$
$\quad$ i = i + 1
End While Process 400 may further include determining if there is CQI/PMI information to transmit for the subframe (block 443). When there is CQI/PMI information, process 400 may further include writing the input vector sequence containing the CQI/PMI information to the matrix in a time-first mapping (block 445). In one implementation, the input vector sequence may be written to the ($R_{mux} \times C_{mux}$) matrix according to the pseudo-code indicated in Table VII. As illustrated, each of the CQI/PMI information input vectors may be mapped to the matrix in a row-wise (time-first) mapping, starting at the index after the last index used for the BI mapping.

TABLE VII

Set i to 0.
While i <$Q'_{CQI}$ :
$\quad y_{i+Q'_{ACK}+Q'_{RI}+Q'_{BI}} = g_i$
$\quad$ i = i + 1
End While Process 400 may further include writing the user data (UL-SCH data) to the matrix in a frequency-first mapping (block 450). The user data may follow the CQI/PMI data in the vector sequence $g_0, g_1, g_2, g_3, \ldots, g_{H'-1}$. In one implementation, the user data vector sequence, $g_{Q'_{CQI}}, g_{Q'_{CQI}+1}, g_{Q'_{CQI}+2}, \ldots, g_{H'-1}$, may be written to the matrix in a column by column (frequency-first) sequence, starting with the vector $y_0$ and moving downward, skipping the matrix entries that are already occupied (i.e., skipping the matrix entries that were written in one of blocks 420, 430, 440, or 445).

Process 400 may further include outputting the matrix as a bit sequence that is read out column by column from the matrix (block 455). The output bit sequence is the output of interleaver 330. The bits after channel interleaving may be denoted by $h_0, h_1, h_2, \ldots, h_{H'_{total} \cdot Q_m \cdot N_L - 1}$, where $N_L$ is the number of layers to which the corresponding user data transport block is mapped. The output bit sequence may subsequently be, for example, modulated and then transmitted over the radio channel after processing by RF circuitry.

Figure 5:
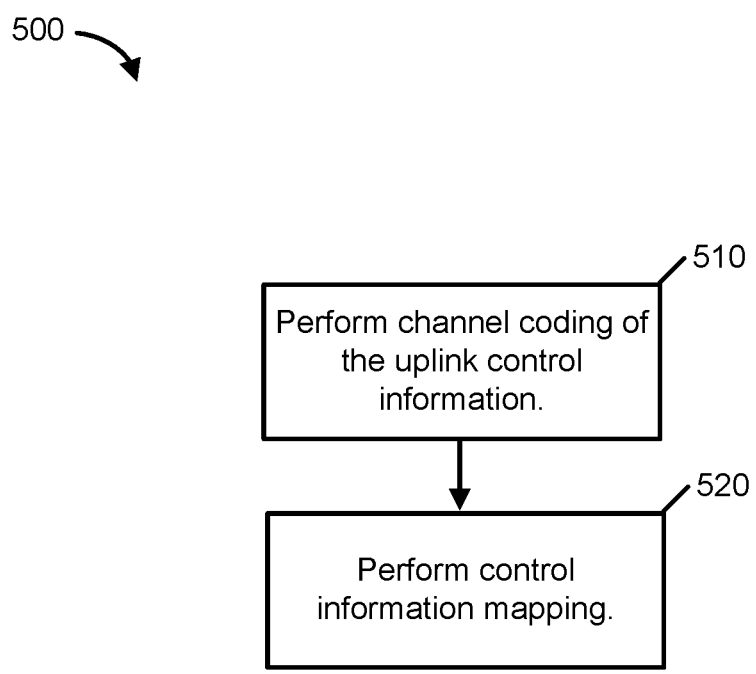
FIG. 5 is a flowchart illustrating an example process corresponding to the coding of an xPUSCH subframe without user data.

In some situations, it may be desirable to transmit uplink control information via xPUSCH without corresponding uplink user data. FIG. 5 is a flowchart illustrating an example process 500 corresponding to the coding of an xPUSCH subframe without user data.

Process 500 may include channel coding of the uplink control information (block 510). The control information may be received by the coding unit, such as control data coder 310, in the form of CQI/PMI information, HARQ-ACK information, RI information, and BI information. Different coding rates for the control information may be obtained by allocating a different number of coded symbols for transmission of the control information. The number of coded symbols Q' for HARQ-ACK, RI, or BI may be calculated, by UE 110, as $$Q' = \min\left(\left\lceil \frac{O \cdot M_{sc}^{PUSCH} \cdot N_{symb}^{PUSCH} \cdot \beta_{offset}^{PUSCH}}{O_{CQI-MIN}} \right\rceil, 4 \cdot M_{sc}^{PUSCH}\right)$$

where O is the number of HARQ-ACK bits as defined in section 5.2.2.6 of 3GPP TS 36.212 (Release 13), RI bits, or BI bits; $O_{CQI-MIN}$ is the number of CQI/PMI bits including CRC bits (assuming rank is equal to 1), $M_{sc}^{PUSCH}$ is the scheduled bandwidth for xPUSCH transmission in the current subframe expressed as a number of subcarriers in 3GPP TS 36.212 (Release 13), where a number of subcarriers used for DMRS transmission is not counted and $N_{symb}^{PUSCH}$ is the number of OFDM symbols in the current xPUSCH transmission sub-frame. For HARQ-ACK information $Q_{ACK} = Q_m \cdot Q'$ and $[\beta_{offset}^{PUSCH} = \beta_{offset}^{HARQ-ACK}/\beta_{offset}^{CQI}]$, where $\beta_{offset}^{HARQ-ACK}$ may be determined according to 3GPP TS 36.213 (Release 13).

For RI $Q_{RI} = Q_m \cdot Q'$ and $[\beta_{offset}^{PUSCH} = \beta_{offset}^{RI}/\beta_{offset}^{CQI}]$, where $\beta_{offset}^{RI}$ may be determined according to 3GPP TS 36.213 (Release 13). Also, for BI, $Q_{BI} = Q_m \cdot Q'$ and $[\beta_{offset}^{PUSCH} = \beta_{offset}^{BI}/\beta_{offset}^{CQI}]$.

For CQI/PMI information, $Q_{CQI} = N_{symb}^{PUSCH} \cdot M_{sc}^{PUSCH} \cdot Q_m - Q_{ACK} - Q_{RI} - Q_{BI}$.

The channel coding and rate matching of the control data may be performed similarly to that described previously with respect to the description of control data coder 310. The coded output sequence for channel quality information may be denoted by $q_0, q_1, q_2, q_3, \ldots, q_{Q_{CQI}-1}$, the coded vector sequence output for HARQ-ACK may denoted by $\underline{q}_0^{ACK}$, $\underline{q}_1^{ACK}, \underline{q}_2^{ACK}, \ldots, \underline{q}_{Q'_{ACK}-1}^{ACK}$, the coded vector sequence output for rank indication may denoted by $\underline{q}_0^{RI}, \underline{q}_1^{RI}, \underline{q}_2^{RI}, \ldots, \underline{q}_{Q'_{RI}-1}^{RI}$, and the coded vector sequence output for beam information may denoted by $\underline{q}_0^{BI}, \underline{q}_1^{BI}, \underline{q}_2^{BI}, \ldots, \underline{q}_{Q'_{BI}-1}^{BI}$.

Referring to FIG. 5, process 500 may further include control information mapping (block 520). The mapping may be performed such that the coded HARQ-ACK information, RI information, BI, or CQI/PMI is mapped to resources in increasing order and first using the frequency domain index, then the time domain index, starting with the n-th symbol in the subframe, where n is 3 or 4.

As used herein, the term "circuitry" or "processing circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 6:
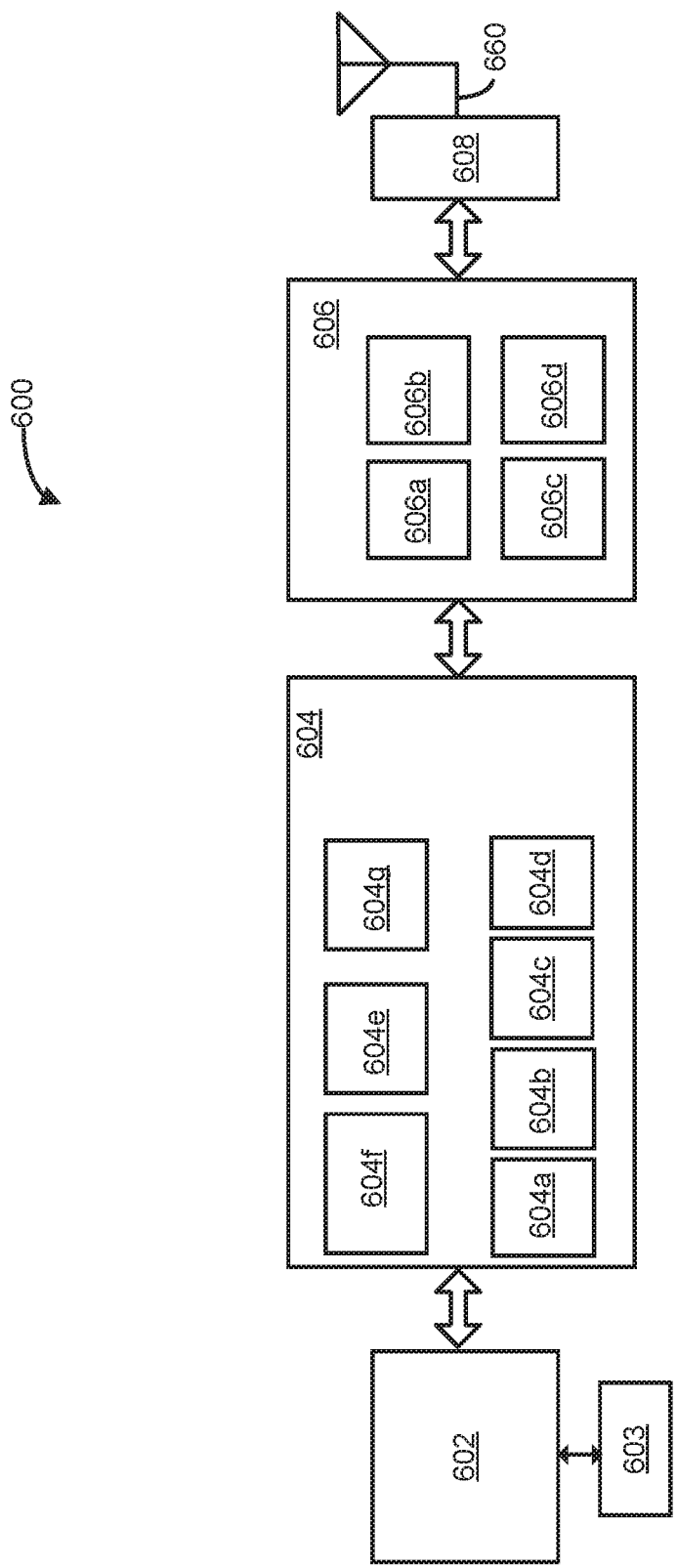
FIG. 6 illustrates example components of an electronic device.

Embodiments described herein may be implemented into a system using any suitably configured hardware and/or software. FIG. 6 illustrates, for one embodiment, example components of an electronic device 600. In embodiments, the electronic device 600 may be a mobile device, a RAN node (e.g., an eNB), or a network controller. In some embodiments, the electronic device 600 may include application circuitry 602, baseband circuitry 604, Radio Frequency (RF) circuitry 606, front-end module (FEM) circuitry 608 and one or more antennas 660, coupled together at least as shown. In embodiments in which a radio interface is not needed for electronic device 600 (e.g., a data gateway, network controller, etc.), the RF circuitry 606, FEM circuitry 608, and antennas 660 may be omitted. In other embodiments, any of said circuitries can be included in different devices.

Application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system. The memory/storage may include, for example, computer-readable medium 603, which may be a non-transitory computer-readable medium. Application circuitry 602 may, in some embodiments, connect to or include one or more sensors, such as environmental sensors, cameras, etc.

Baseband circuitry 604 may include circuitry such as, but not limited to, one or more single-core or multi-core processors. The baseband circuitry 604 may include one or more baseband processors and/or control logic to process baseband signals received from a receive signal path of the RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a second generation (2G) baseband processor 604a, third generation (3G) baseband processor 604b, fourth generation (4G) baseband processor 604c, and/or other baseband processor(s) (e.g., a fifth generation baseband processor) 604d for other existing generations, generations in development or to be developed in the future (e.g., fifth generation (5G), 6G, etc.). The baseband circuitry 604 (e.g., one or more of baseband processors 604a-d) may handle various radio control functions that enable communication with one or more radio networks via the RF circuitry 606. The radio control functions may include, but are not limited to, signal modulation/demodulation, encoding/decoding, radio frequency shifting, etc. In some implementations, the functionality of baseband circuitry 604 may be wholly or partially implemented by memory/storage devices configured to execute instructions stored in the memory/storage. The memory/storage may include, for example, a non-transitory computer-readable medium 604g.

In some embodiments, modulation/demodulation circuitry of the baseband circuitry 604 may include Fast-Fourier Transform (FFT), precoding, and/or constellation mapping/demapping functionality. In some embodiments, encoding/decoding circuitry of the baseband circuitry 604 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments. In some embodiments, the baseband circuitry 604 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 604e of the baseband circuitry 604 may be configured to run elements of the protocol stack for signaling of the PHY, MAC, RLC, PDCP and/or RRC layers. In some embodiments, the baseband circuitry may include one or more audio digital signal processor(s) (DSP) 604f. The audio DSP(s) 604f may be include elements for compression/decompression and echo cancellation and may include other suitable processing elements in other embodiments.

In some embodiments, the baseband circuitry 604 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 604e of the baseband circuitry 604 may be configured to run elements of the protocol stack for signaling of the PHY, MAC, RLC, PDCP and/or RRC layers. In some embodiments, the baseband circuitry may include one or more audio digital signal processor(s) (DSP) 604f The audio DSP(s) 104f may be include elements for compression/decompression and echo cancellation and may include other suitable processing elements in other embodiments.

Baseband circuitry 604 may further include memory/storage 604g. The memory/storage 604g may be used to load and store data and/or instructions for operations performed by the processors of the baseband circuitry 604. Memory/storage 604g may particularly include a non-transitory memory. Memory/storage for one embodiment may include any combination of suitable volatile memory and/or non-volatile memory. The memory/storage 604g may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 604g may be shared among the various processors or dedicated to particular processors.

Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the RF circuitry 606 may include a receive signal path and a transmit signal path. The receive signal path of the RF circuitry 606 may include mixer circuitry 606a, amplifier circuitry 606b and filter circuitry 606c. The transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals.

Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c. The filter circuitry 606c may include a low-pass filter (LPF), although the scope of the embodiments is not limited in this respect.

In some embodiments, the mixer circuitry 606a of the receive signal path and the mixer circuitry 606a of the transmit signal path may include two or more mixers and may be arranged for quadrature downconversion and/or upconversion respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a may be arranged for direct downconversion and/or direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+6 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+6 synthesizer.

In some embodiments, frequency input may be provided by a voltage-controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+6 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path which may include circuitry configured to operate on RF signals received from one or more antennas 660, amplify the received signals and provide the amplified versions of the received signals to the RF circuitry 606 for further processing. FEM circuitry 608 may also include a transmit signal path which may include circuitry configured to amplify signals for transmission provided by the RF circuitry 606 for transmission by one or more of the one or more antennas 660.

In some embodiments, the FEM circuitry 608 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 660).

In some embodiments, the electronic device 600 may include additional elements such as, for example, memory/storage, display, camera, sensors, and/or input/output (I/O) interface. In some embodiments, the electronic device of FIG. 6 may be configured to perform one or more methods, processes, and/or techniques such as those described herein.

A number of examples, relating to implementations of the techniques described above, will next be given.

In a first example, a baseband apparatus for User Equipment (UE) for a cellular network, may comprise one or more processors to: encode, for a Physical Uplink Shared Channel (PUSCH) of the cellular wireless network, control information including beam information (BI), the BI information including parameters relating to multi-antenna beamforming by the UE; interleave the encoded control information with user data, the interleaving including: writing the control information to a matrix in a time-first mapping order, writing the user data to the matrix in a frequency-first mapping order, and reading out the matrix to obtain an interleaved bit stream; and output the interleaved bit stream for radio frequency processing and transmission via a radio channel.

In example 2, the subject matter of example 1, or any of the examples herein, wherein the control information includes additional control information types, the additional control information types including Hybrid Automatic Repeat Request (HARQ) acknowledgement feedback information, Rank Indicator (RI) information, and Channel Quality Indicator (CQI) or Precoding Matrix Indicator (PMI) information.

In example 3, the subject matter of example 2, or any of the examples herein, wherein the apparatus further comprises circuitry to: determine a number of resource elements to allocate, within the PUSCH, for each of the control information types.

In example 4, the subject matter of examples 1 or 2, or any of the examples herein, wherein the apparatus further comprises circuitry to: multiplex a portion of the encoded control information and the user data to obtain a sequence of vector data in which the portion of the control information and the user data are mapped to different modulation symbols in the sequence of vector data; and provide the sequence of vector data as an input to the interleaving operation.

In example 5, the subject matter of example 1, or any of the examples herein, wherein the time-first mapping corresponds to writing the control information, to the matrix, in a row-by-row order, and wherein the frequency-first mapping corresponds to writing the user data, to the matrix, in a column-by-column order.

In example 6, the subject matter of example 1, or any of the examples herein, wherein the outputting of the interleaved bit stream includes reading from the matrix in a column-by-column order.

In example 7, the subject matter of any of the examples herein, wherein the control information is encoded for transmission in both of the PUSCH and a Physical Uplink Control Channel (PUCCH).

In example 8, the subject matter of example 1, or any of the examples herein, wherein the number of columns and rows of the matrix is determined based on a number of OFDM symbols per subframe of the PUSCH.

In example 9, the subject matter of example 1, or any of the examples herein, wherein the encoded control information includes a sequence of vectors.

In a tenth example, UE may comprise logic to: determine, for an uplink shared channel in a cellular wireless network, control information including beam information (BI) and Channel Quality Indicator (CQI) information, the BI information including parameters relating to multi-antenna beamforming by the UE; interleave the control information with user data, the interleaving including: writing the control information to a matrix in a time-first mapping order, writing the user data to the matrix in a frequency-first mapping order, wherein the writing in the frequency-first direction includes skipping entries in the matrix to which the control information was written, and reading out the matrix to obtain an interleaved bit stream; and transmit, using radio frequency (RF) transmission circuitry and via a radio channel, the interleaved bit stream.

In example 11, the subject matter of example 10, or any of the examples herein, wherein the control information includes additional control information types, the additional control information types including Hybrid Automatic Repeat Request (HARD) acknowledgement feedback information and Rank Indicator (RI) information.

In example 12, the subject matter of example 11, or any of the examples herein, wherein the UE further comprises logic to: determine a number of resource elements to allocate, within the uplink shared channel, for each of the control information types.

In example 13, the subject matter of examples 10, 11, or 12, or any of the examples herein, wherein the uplink shared channel includes a Physical Uplink Shared Channel (PUSCH).

In example 14, the subject matter of examples 10, 11, or 12, or any of the examples herein, wherein the UE further comprises logic to: multiplex a portion of the control information and the user data to obtain a sequence of vector data in which the control information and the user data are mapped to different modulation symbols in the sequence of vector data; and provide the sequence of vector data as an input to the interleaving operation.

In example 15, the subject matter of examples 10, 11, or 12, or any of the examples herein, wherein the time-first mapping corresponds to writing the control information, to the matrix, in a row-by-row order, and wherein the frequency-first mapping corresponds to writing the user data, to the matrix, in a column-by-column order.

In example 16, the subject matter of examples 10, 11, or 12, or any of the examples herein, wherein reading out the matrix to obtain the interleaved bit stream includes reading from the matrix in a column-by-column order.

In a seventeenth example, a computer-readable medium may contain program instructions for causing one or more processors, associated with UE, to: encode, for a Physical Uplink Shared Channel (PUSCH) of a cellular wireless network, control information including beam information (BI), the BI information including parameters relating to multi-antenna beamforming by the UE; interleave the encoded control information with user data, the interleaving including: writing the control information to a matrix in a time-first mapping order, writing the user data to the matrix in a frequency-first mapping order, and reading out the matrix to obtain an interleaved bit stream; and output the interleaved bit stream for subsequent radio frequency processing and transmission via a radio channel.

In example 18, the subject matter of example 17, or any of the examples herein, wherein the control information includes additional control information types, the additional control information types including Hybrid Automatic Repeat Request (HARD) acknowledgement feedback information, Rank Indicator (RI) information, and Channel Quality Indicator (CQI) or Precoding Matrix Indicator (PMI) information.

In example 19, the subject matter of example 18, or any of the examples herein, wherein the program instructions further cause the one or more processors to: determine a number of resource elements to allocate, within the PUSCH, for each of the control information types.

In example 20, the subject matter of examples 17 or 18, or any of the examples herein, wherein the program instructions further cause the one or more processors to: multiplex a portion of the encoded control information and the user data to obtain a sequence of vector data in which the portion of the control information and the user data are mapped to different modulation symbols in the sequence of vector data; and provide the sequence of vector data as an input to the interleaving operation.

In example 21, the subject matter of example 17, or any of the examples herein, wherein the time-first mapping corresponds to writing the control information, to the matrix, in a row-by-row order, and wherein the frequency-first mapping corresponds to writing the user data, to the matrix, in a column-by-column order.

In example 22, the subject matter of example 17, or any of the examples herein, wherein the output of the interleaved bit stream includes reading from the matrix in a column-by-column order.

In example 23, the subject matter of example 17, or any of the examples herein, wherein the control information is encoded for transmission in both of the PUSCH and the Physical Uplink Control Channel (PUCCH).

In a twenty-fourth example, a method, implemented by UE, may comprise: encoding, for a Physical Uplink Shared Channel (PUSCH) of a cellular wireless network, control information including beam information (BI), the BI information including parameters relating to multi-antenna beamforming by the UE; interleaving the encoded control information with user data, the interleaving including: writing the control information to a matrix in a time-first mapping order, writing the user data to the matrix in a frequency-first mapping order, and reading out the matrix to obtain an interleaved bit stream; and outputting the interleaved bit stream for radio frequency processing and transmission via a radio channel.

In example 25, the subject matter of example 24, or any of the examples herein, wherein the control information includes additional control information types, the additional control information types including Hybrid Automatic Repeat Request (HARD) acknowledgement feedback information, Rank Indicator (RI) information, and Channel Quality Indicator (CQI) or Precoding Matrix Indicator (PMI).

In example 26, the subject matter of example 25, or any of the examples herein, wherein the apparatus further comprises circuitry to: determine a number of resource elements to allocate, within the PUSCH, for each of the control information types.

In example 27, the subject matter of examples 24 or 25, or any of the examples herein, further comprising: multiplexing a portion of the encoded control information and the user data to obtain a sequence of vector data in which the portion of the control information and the user data are mapped to different modulation symbols in the sequence of vector data; and providing the sequence of vector data as an input to the interleaving operation.

In example 28, the subject matter of example 24, or any of the examples herein, wherein the time-first mapping corresponds to writing the control information, to the matrix, in a row-by-row order, and wherein the frequency-first mapping corresponds to writing the user data, to the matrix, in a column-by-column order.

In example 29, the subject matter of example 24, or any of the examples herein, wherein the outputting the interleaved bit stream includes reading from the matrix in a column-by-column order.

In example 30, the subject matter of example 24, or any of the examples herein, wherein the control information is encoded for transmission in both of the PUSCH and the Physical Uplink Control Channel (PUCCH).

In a thirty-first example, a device may comprise: means for encoding, for a Physical Uplink Shared Channel (PUSCH) of a cellular wireless network, control information including beam information (BI), the BI information including parameters relating to multi-antenna beamforming by the UE; means for interleaving the encoded control information with user data, the interleaving including: writing the control information to a matrix in a time-first mapping order, writing the user data to the matrix in a frequency-first mapping order, and reading out the matrix to obtain an interleaved bit stream; and means for outputting the interleaved bit stream for radio frequency processing and transmission via a radio channel.

In example 32, the subject matter of example 31, or any of the examples herein, wherein the control information includes additional control information types, the additional control information types including Hybrid Automatic Repeat Request (HARD) acknowledgement feedback information, Rank Indicator (RI) information, and Channel Quality Indicator (CQI) or Precoding Matrix Indicator (PMI).

In example 33, the subject matter of example 31, or any of the examples herein, further comprising: means for determining a number of resource elements to allocate, within the PUSCH, for each of the control information types.

In the preceding specification, various embodiments have been described with reference to the accompanying drawings. It will, however, be evident that various modifications and changes may be made thereto, and additional embodiments may be implemented, without departing from the broader scope as set forth in the claims that follow. The specification and drawings are accordingly to be regarded in an illustrative rather than restrictive sense.

For example, while series of signals and/or operations have been described with regard to FIGS. 4A, 4B, and 5, the order of the signals may be modified in other implementations. Further, non-dependent signals may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used.

What is claimed is:

1. A baseband apparatus for User Equipment (UE) for a cellular network, comprising one or more processors to:
    encode, for a Physical Uplink Shared Channel (PUSCH) of the cellular wireless network, control information including beam information (BI), the BI information including parameters relating to multi-antenna beamforming by the UE;
    interleave the encoded control information with user data, the interleaving including:
        writing the control information to a matrix in a time-first mapping order,
        writing the user data to the matrix in a frequency-first mapping order, and
        reading out the matrix to obtain an interleaved bit stream; and
    output the interleaved bit stream for radio frequency processing and transmission via a radio channel.

2. The apparatus of claim 1, wherein the control information includes additional control information types, the additional control information types including Hybrid Automatic Repeat Request (HARQ) acknowledgement feedback information, Rank Indicator (RI) information, and Channel Quality Indicator (CQI) or Precoding Matrix Indicator (PMI) information.

3. The apparatus of claim 2, wherein the apparatus further comprises circuitry to:
    determine a number of resource elements to allocate, within the PUSCH, for each of the control information types.

4. The apparatus of claim 1, wherein the apparatus further comprises circuitry to:
    multiplex a portion of the encoded control information and the user data to obtain a sequence of vector data in which the portion of the control information and the user data are mapped to different modulation symbols in the sequence of vector data; and
    provide the sequence of vector data as an input to the interleaving operation.

5. The apparatus of claim 1, wherein the time-first mapping corresponds to writing the control information, to the matrix, in a row-by-row order, and wherein the frequency-first mapping corresponds to writing the user data, to the matrix, in a column-by-column order.

6. The apparatus of claim 1, wherein the outputting of the interleaved bit stream includes reading from the matrix in a column-by-column order.

7. The apparatus of claim 1, wherein the control information is encoded for transmission in both of the PUSCH and a Physical Uplink Control Channel (PUCCH).

8. The apparatus of claim 1, wherein the number of columns and rows of the matrix is determined based on a number of OFDM symbols per subframe of the PUSCH.

9. The apparatus of claim 1, wherein the encoded control information includes a sequence of vectors.

10. User Equipment (UE) comprising logic to:
    determine, for an uplink shared channel in a cellular wireless network, control information including beam information (BI) and Channel Quality Indicator (CQI) information, the BI information including parameters relating to multi-antenna beamforming by the UE;
    interleave the control information with user data, the interleaving including:
        writing the control information to a matrix in a time-first mapping order,
        writing the user data to the matrix in a frequency-first mapping order, wherein the writing in the frequency-first direction includes skipping entries in the matrix to which the control information was written, and
        reading out the matrix to obtain an interleaved bit stream; and
    transmit, using radio frequency (RF) transmission circuitry and via a radio channel, the interleaved bit stream.

11. The UE of claim 10, wherein the control information includes additional control information types, the additional control information types including Hybrid Automatic Repeat Request (HARQ) acknowledgement feedback information and Rank Indicator (RI) information.

12. The UE of claim 11, wherein the UE further comprises logic to:
    determine a number of resource elements to allocate, within the uplink shared channel, for each of the control information types.

13. The UE of any of claim 10, wherein the uplink shared channel includes a Physical Uplink Shared Channel (PUSCH).

14. The UE of any of claim 10, wherein the UE further comprises logic to:
    multiplex a portion of the control information and the user data to obtain a sequence of vector data in which the control information and the user data are mapped to different modulation symbols in the sequence of vector data; and
    provide the sequence of vector data as an input to the interleaving operation.

15. The UE of any of claim 10, wherein the time-first mapping corresponds to writing the control information, to the matrix, in a row-by-row order, and wherein the frequency-first mapping corresponds to writing the user data, to the matrix, in a column-by-column order.

16. The UE of any of claim 10, wherein reading out the matrix to obtain the interleaved bit stream includes reading from the matrix in a column-by-column order.

17. A non-transitory computer-readable medium containing program instructions for causing one or more processors, associated with User Equipment (UE), to:
    encode, for a Physical Uplink Shared Channel (PUSCH) of a cellular wireless network, control information including beam information (BI), the BI information including parameters relating to multi-antenna beamforming by the UE;
    interleave the encoded control information with user data, the interleaving including:
        writing the control information to a matrix in a time-first mapping order,
        writing the user data to the matrix in a frequency-first mapping order, and
        reading out the matrix to obtain an interleaved bit stream; and
    output the interleaved bit stream for subsequent radio frequency processing and transmission via a radio channel.

18. The non-transitory computer-readable medium of claim 17, wherein the control information includes additional control information types, the additional control information types including Hybrid Automatic Repeat Request (HARQ) acknowledgement feedback information, Rank Indicator (RI) information, and Channel Quality Indicator (CQI) or Precoding Matrix Indicator (PMI) information.

19. The non-transitory computer-readable medium of claim 18, wherein the program instructions further cause the one or more processors to:
- determine a number of resource elements to allocate, within the PUSCH, for each of the control information types.

20. The non-transitory computer-readable medium of claim 18, wherein the program instructions further cause the one or more processors to:
- multiplex a portion of the encoded control information and the user data to obtain a sequence of vector data in which the portion of the control information and the user data are mapped to different modulation symbols in the sequence of vector data; and
- provide the sequence of vector data as an input to the interleaving operation.

\* \* \* \* \*